(12) United States Patent
Minemura

(10) Patent No.: US 8,529,182 B2
(45) Date of Patent: Sep. 10, 2013

(54) TRANSPORT APPARATUS AND LIBRARY APPARATUS

(75) Inventor: Tsukasa Minemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/716,625

(22) Filed: Mar. 3, 2010

(65) Prior Publication Data

US 2010/0238589 A1   Sep. 23, 2010

(30) Foreign Application Priority Data

Mar. 19, 2009   (JP) .................................. 2009-67261

(51) Int. Cl.
*B65G 1/06* (2006.01)
(52) U.S. Cl.
USPC ............................................ 414/283; 474/87
(58) Field of Classification Search
USPC .................. 414/331.14, 331.16, 331.18, 268, 414/281–283; 474/87, 84, 86
See application file for complete search history.

(56) References Cited

U.S. PATENT DOCUMENTS

| | | | | |
|---|---|---|---|---|
| 3,782,565 A | * | 1/1974 | Doran et al. | 414/274 |
| 3,809,259 A | * | 5/1974 | Pipes | 414/280 |
| 5,184,262 A | * | 2/1993 | Watanabe et al. | 360/96.2 |
| 5,639,041 A | | 6/1997 | Wada | |
| 6,288,865 B1 | * | 9/2001 | Hirabayashi et al. | 360/96.3 |
| 7,101,139 B1 | * | 9/2006 | Benedict | 414/281 |
| 2007/0008640 A1 | | 1/2007 | Sasaki | |
| 2007/0162920 A1 | | 7/2007 | Nakade et al. | |

FOREIGN PATENT DOCUMENTS

| | | |
|---|---|---|
| CN | 1892855 A | 1/2007 |
| JP | 6-111439 | 4/1994 |
| JP | 11-314778 | 11/1999 |
| JP | 2000-306301 | 11/2000 |
| JP | 2001-167494 | 6/2001 |
| JP | 2002-175654 | 6/2002 |
| JP | 2003-59170 | 2/2003 |
| JP | 2003-305681 | 10/2003 |
| JP | 2005-209312 | 8/2005 |

OTHER PUBLICATIONS

Chinese Office Action issued Sep. 30, 2011 in corresponding Chinese Patent Application No. 201010138229.3.
English Translation of Notice of Reasons for Rejection, mailed Apr. 5, 2011, in Japanese Application No. 2009-067261 (2 pp.).

* cited by examiner

*Primary Examiner* — Jonathan Snelting
(74) *Attorney, Agent, or Firm* — Staas & Halsey LLP

(57) ABSTRACT

A transport apparatus and a library apparatus are provided. The transport apparatus includes a holding mechanism, a base and a lifting/lowering mechanism. The holding mechanism holds an object to transport. The holding mechanism is mounted on a base. The lifting/lowering mechanism lifts and lowers the base in first directions. The drive mechanism moves the holding mechanism in a plane including second directions that are different from the first directions.

2 Claims, 19 Drawing Sheets

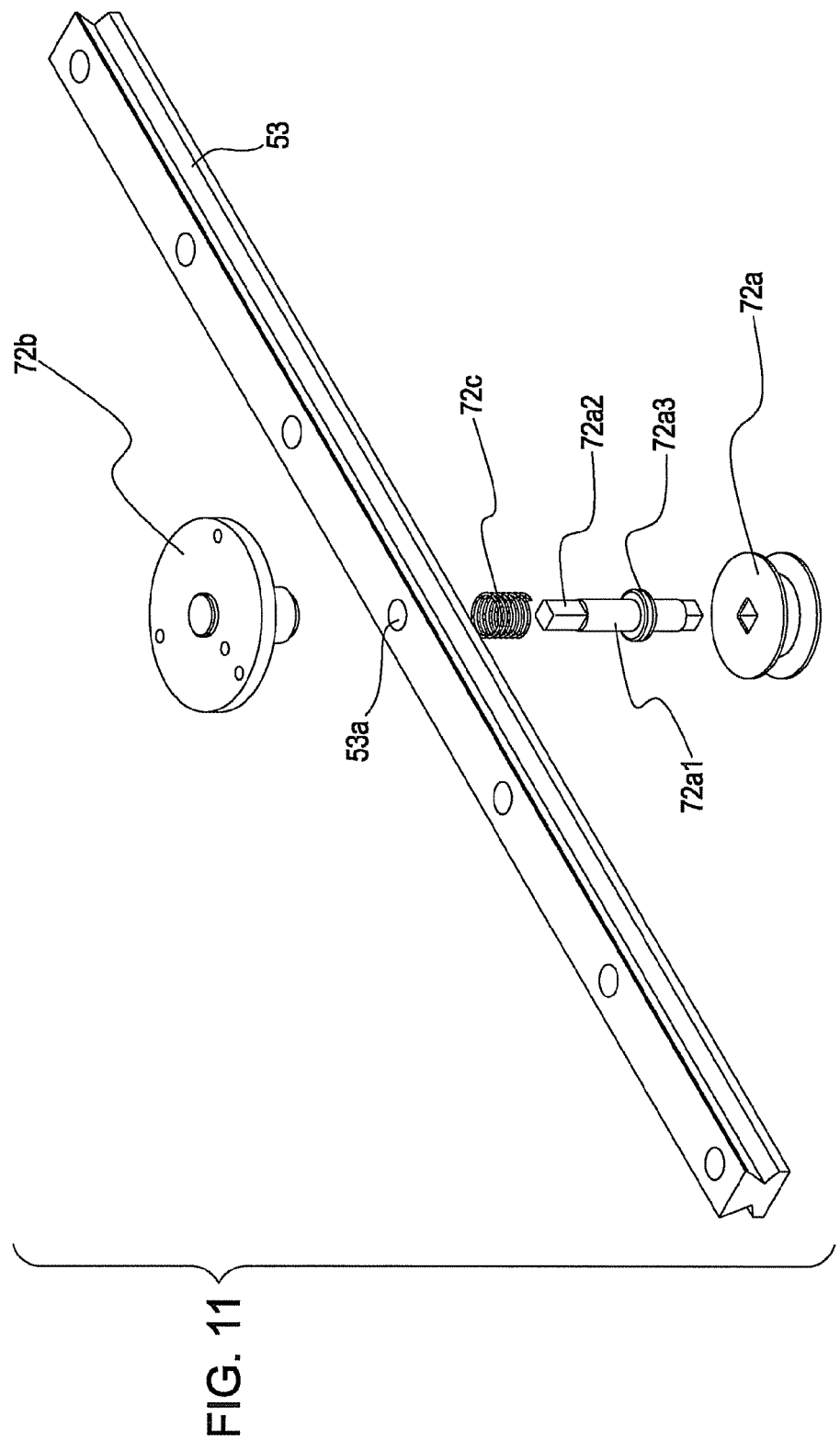

TRANSPORT APPARATUS AND LIBRARY APPARATUS

CROSS-REFERENCE TO RELATED APPLICATIONS

This application is related to and claims priority to Japanese Patent Application No. 2009-67261, filed on Mar. 19, 2009, and incorporated herein by reference.

BACKGROUND

1. Field

The embodiments disclosed herein are related to a transport apparatus and a library apparatus.

2. Description of the Related Art

A library apparatus includes a storage shelf for storing data media such as magnetic disk cartridges (see, for example, Japanese Unexamined Patent Application Publication No. 06-111439). The library apparatus includes a read/write unit into which a data medium is inserted so as to read/write data. The library apparatus further includes a transport apparatus for transporting the data medium between the storage shelf and the read/write unit.

The transport apparatus includes a holding mechanism with a dedicated drive unit for holding the data medium. The transport apparatus further includes a lifting/lowering mechanism, a lateral movement mechanism, and a rotation mechanism for moving the holding mechanism. The lifting/lowering mechanism includes a dedicated drive unit, and lifts and lowers the holding mechanism while maintaining the holding mechanism parallel to the storage shelf. The lateral movement mechanism includes a dedicated drive unit, and moves the holding mechanism sideways while maintaining the holding mechanism parallel to the storage shelf.

The rotation mechanism rotates the holding mechanism between the direction in which the holding mechanism faces the storage shelf and the direction in which the holding mechanism faces the read/write unit. The holding mechanism is mounted on the base. The lifting/lowering mechanism lifts and lowers the base so as to move the holding mechanism up and down, that is, for example, in vertical directions. The lateral movement mechanism moves the holding mechanism sideways on the base, that is, for example, in horizontal directions.

As electronic equipment reduces in size, reduction in the size of library apparatuses and media transport apparatuses is required.

However, conventional library apparatus including dedicated drive units for corresponding movements are difficult to reduce in size.

SUMMARY

It is an aspect of the embodiments discussed herein to provide a transport apparatus that includes a holding mechanism, a base and a lifting/lowering mechanism.

The aspect can be attained with an apparatus including a holding mechanism that holds an object to transport. The holding mechanism is mounted on the base. The lifting/lowering mechanism lifts and lowers the base in first directions. The drive mechanism moves the holding mechanism in a plane including second directions that are different from the first directions.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is an exploded view of a first clutch.

DETAILED DESCRIPTION OF THE EMBODIMENTS

An exemplary embodiment is disclosed. Sizes or the proportions of actual components may be different from the illustrated sizes or proportions.

Figure 1:
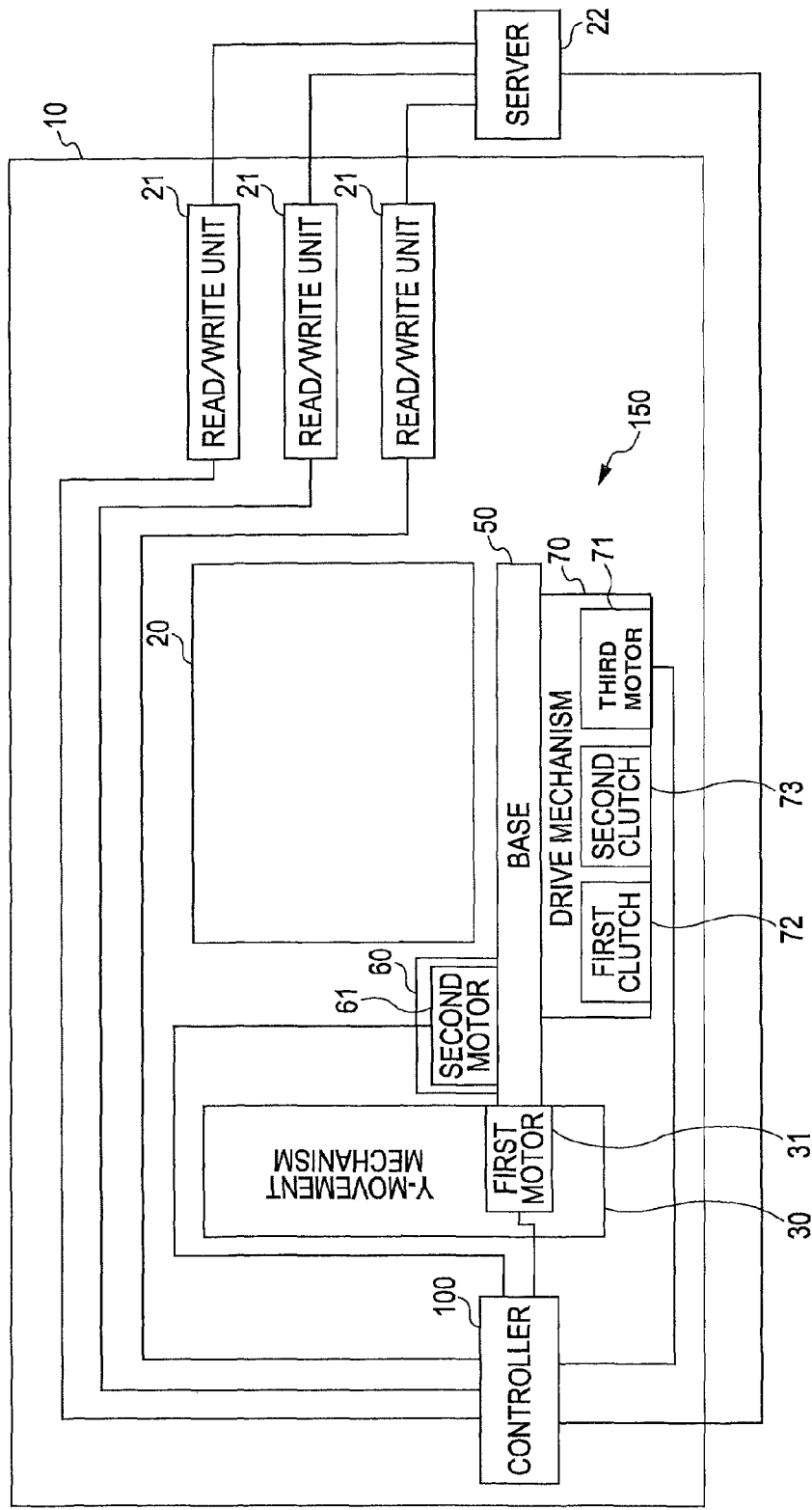
FIG. 1 illustrates a library apparatus.
Figure 2:
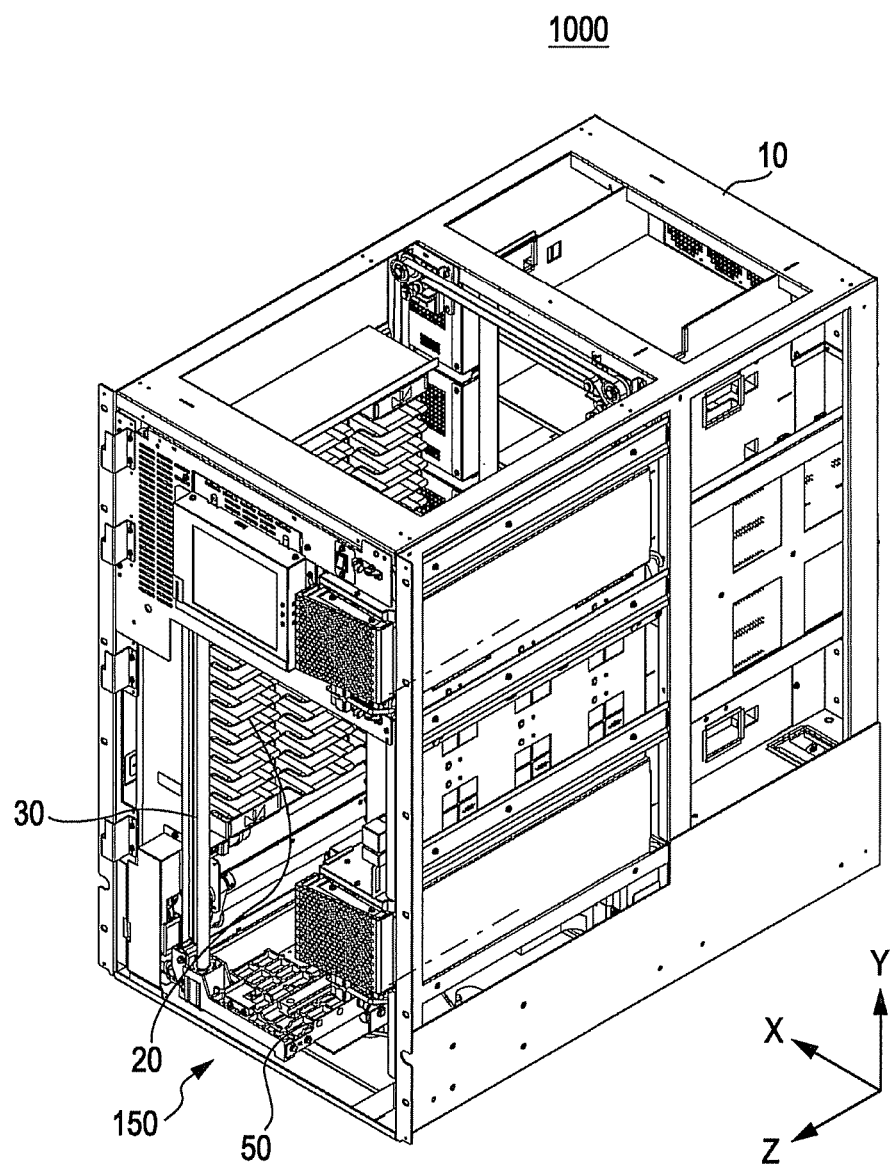
FIG. 2 illustrates an exemplary library apparatus.

FIG. 1 illustrates an exemplary library apparatus 1000. FIG. 2 is a schematic perspective view of the library apparatus 1000. In the following description of the embodiment, directions will be indicated by using three dimensional X, Y, and Z directions perpendicular to one another, as illustrated in FIG. 2.

The library apparatus 1000 includes a housing 10. A storage shelf 20 may be disposed in the housing 10. The storage shelf 20 stores magnetic disk cartridges, which are data media. The magnetic disk cartridges are objects to be transported. The storage shelf 20 includes a plurality of storage sections in which the magnetic disk cartridges are stored. The storage sections are arranged vertically and horizontally. The library apparatus 1000 includes read/write units 21 in the housing 10. The read/write units 21 are connected to a server 22, and the magnetic disk cartridges are inserted into the read/write units 21 so as to read and write data from and onto the magnetic disk cartridges. Cartridge insertion slots of the storage sections of the storage shelf 20 are located at positions that are rotated by 90° with respect to cartridge insertion slots of the read/write units 21. The library apparatus 1000 includes a transport apparatus 150 in the housing 10. The transport apparatus 150 transports the magnetic disk cartridges between the storage shelf 20 and the read/write units 21, which have the above-described positional relationship. A controller 100 of the transport apparatus 150 may be disposed in the housing 10. The controller 100 may be connected to the server 22.

Figure 3:
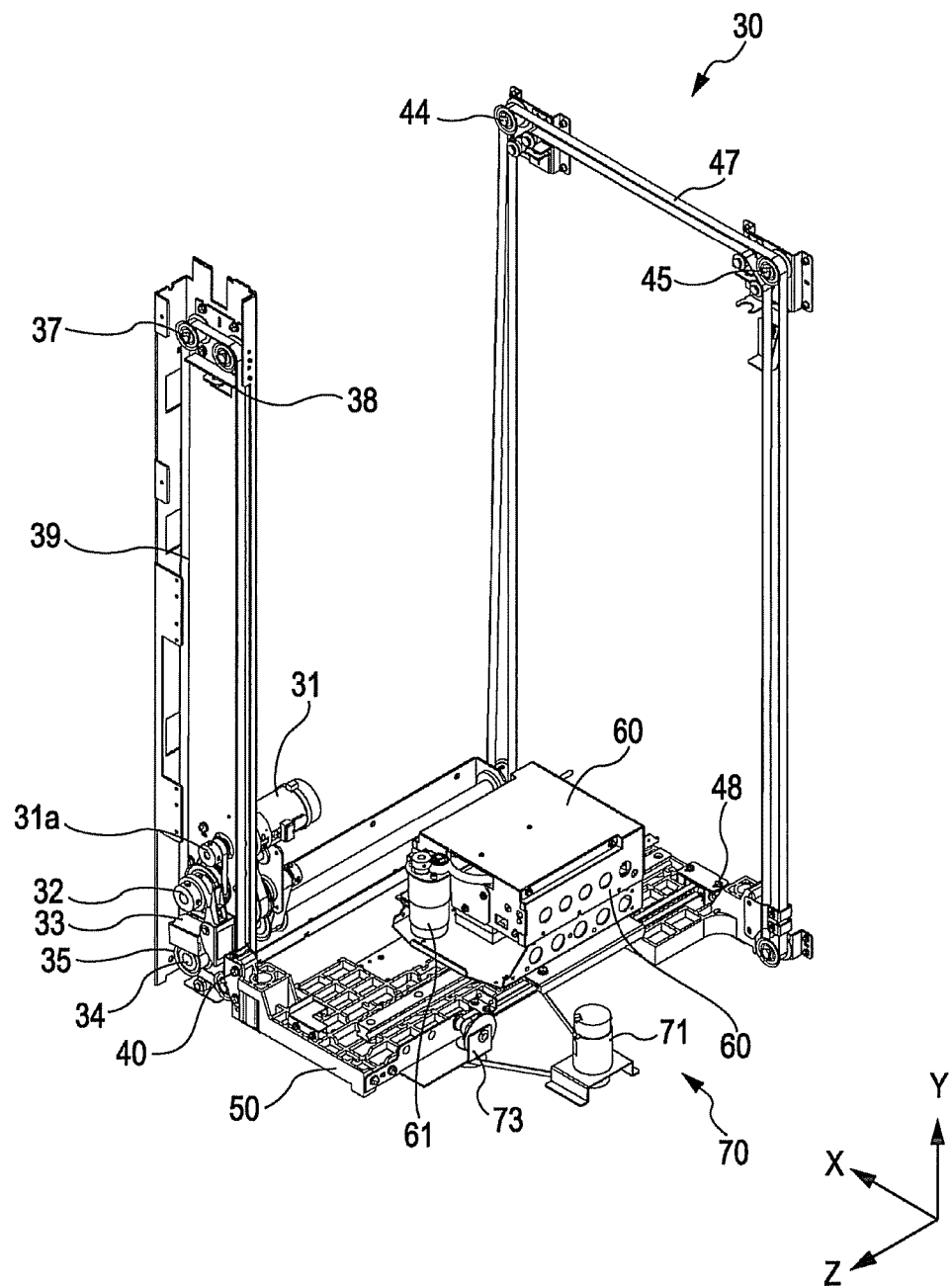
FIG. 3 illustrates an exemplary transport apparatus included in the library apparatus.

FIG. 3 illustrates the transport apparatus 150. The transport apparatus 150 includes a holding mechanism 60 for holding a magnetic disk cartridge, and a base 50 on which the holding mechanism 60 may be mounted. The transport apparatus 150 includes a Y-movement mechanism 30 for lifting and lowering the base 50 in first directions. The Y-movement mechanism 30 is an example of a lifting/lowering mechanism. In the present embodiment, the first directions are the positive and negative Y directions, which correspond to the vertical directions. The transport apparatus 150 includes a drive mechanism 70 for moving the holding mechanism 60 in a plane including second directions different from the first directions. In an exemplary embodiment, the second directions different from the first directions are the positive and negative Z directions, which correspond to horizontal directions. In an exemplary embodiment, movement of the holding mechanism 60 in a plane including the horizontal directions includes movement in the Z directions and rotation.

The holding mechanism 60 includes a mechanism driven by a second motor 61. The holding mechanism 60 may be moved between a target storage section and the read/write unit 21 by the Y-movement mechanism 30 and the drive mechanism 70. The holding mechanism 60 rotates so that the holding mechanism faces the target storage section and the read/write unit 21.

Figure 4:
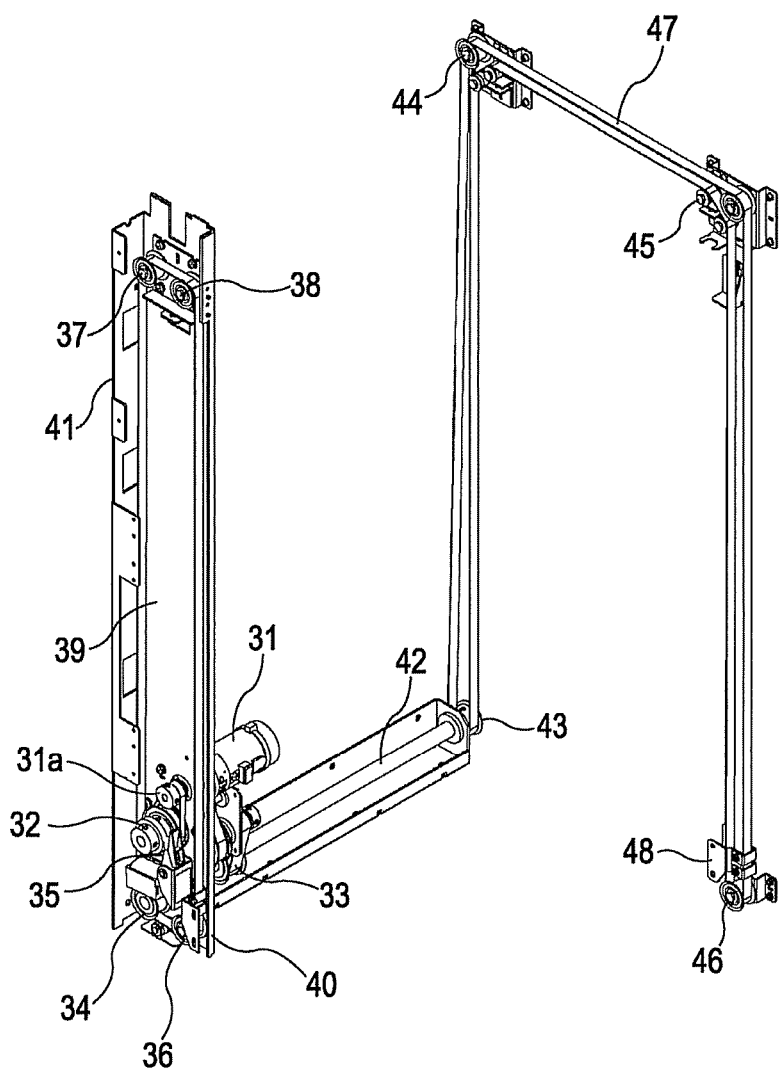
FIG. 4 illustrates an exemplary Y-movement mechanism.

FIG. 4 is a perspective view of the Y-movement mechanism 30. The Y-movement mechanism 30 includes a first motor 31 attached to a frame member 41. The first motor 31 may be electrically connected to the controller 100. A first pulley 31a may be attached to the rotation shaft of the first motor 31. A second pulley 32 and a third pulley 34 are attached to the frame member 41. A first belt 33 may be looped over the first pulley 31a and the second pulley 32. A second belt 35 may be looped over the second pulley 32 and the third pulley 34. The third pulley 34 may be attached to an end of a transmission shaft 42.

Figure 5:
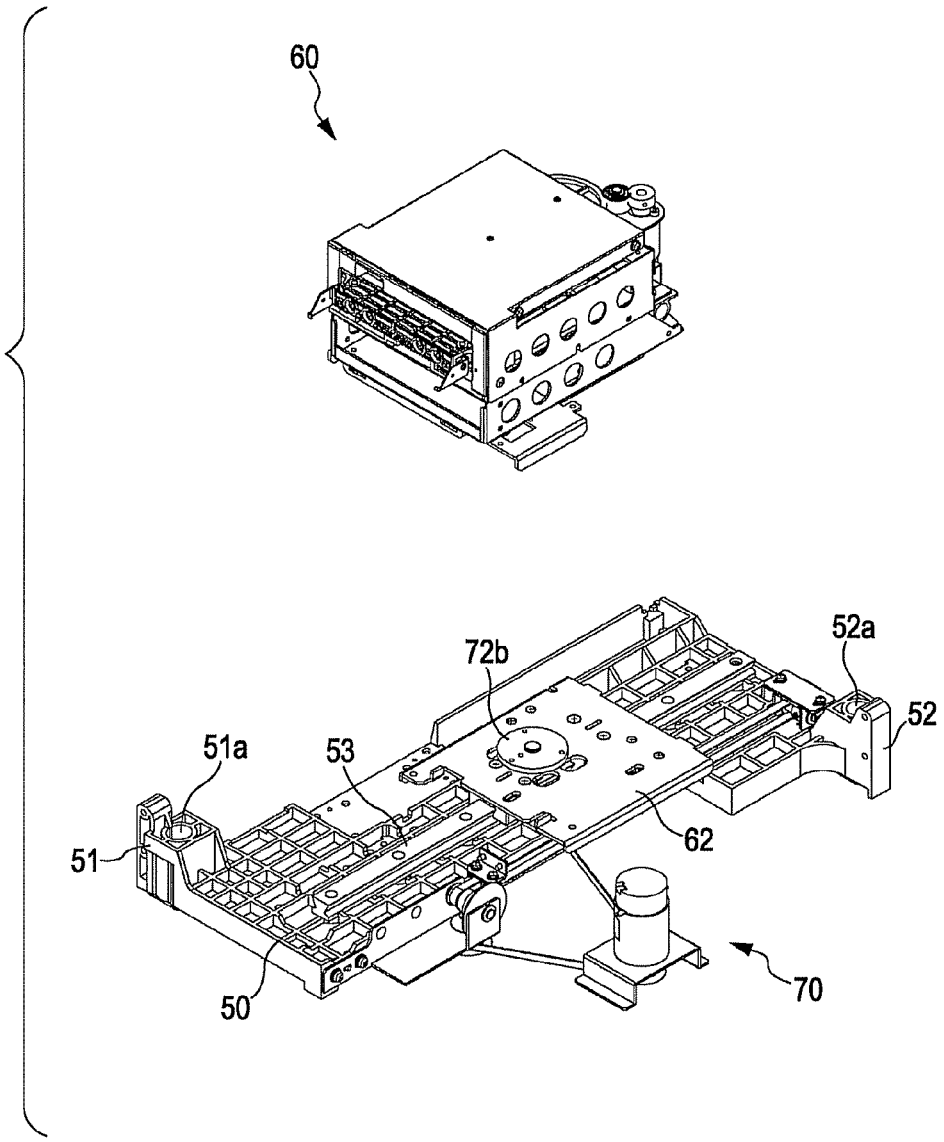
FIG. 5 illustrates an exemplary state in which the holding mechanism is removed from a base.

A fourth pulley 36 may be attached to the frame member 41 at a position adjacent to the third pulley 34. To the frame member 41, a fifth pulley 37 may be attached above the third pulley 34, and a sixth pulley 38 may be attached above the fourth pulley 36. A third belt 39 may be looped over the third pulley 34, the fourth pulley 36, the fifth pulley 37, and the sixth pulley 38. A first attachment member 40 may be attached to the third belt 39. The first attachment member 40 may be attached to the base 50. To be specific, as illustrated in FIG. 5, a first attachment portion 51 may be disposed at a corner of the base 50, and the first attachment member 40 may be attached to the first attachment portion 51.

To the other end of the transmission shaft 42, which may be opposite the end to which the third pulley 34 may be attached, a seventh pulley 43 may be attached. An eighth pulley 44 may be disposed above the seventh pulley 43. A ninth pulley 45 may be disposed to a side of the eighth pulley 44. A tenth pulley 46 may be disposed below the ninth pulley 45. Thus, the seventh to tenth pulleys 43 to 46 are arranged in a rectangular shape. A fourth belt 47 may be looped over the seventh to tenth pulleys 43 to 46. A second attachment member 48 may be attached to the fourth belt 47. The second attachment member 48 may be attached to the base 50. As illustrated in FIG. 5, a second attachment portion 52 may be disposed at a corner of the base 50, and the second attachment member 48 may be attached to the second attachment portion 52.

Figure 8:
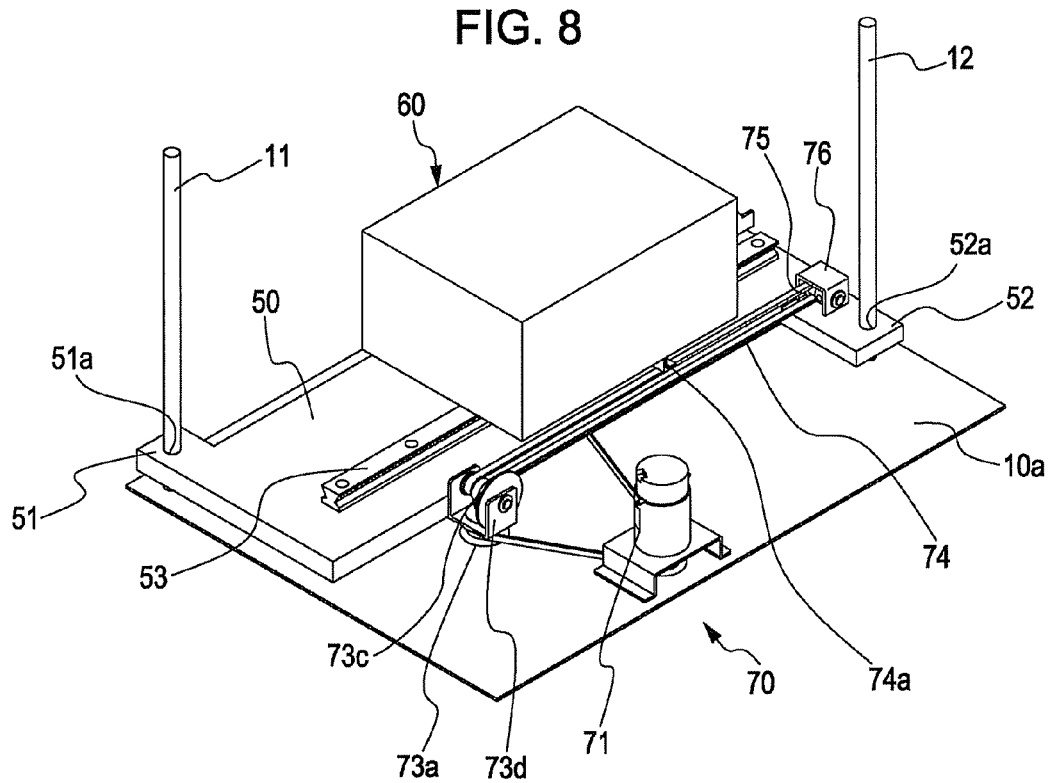
FIG. 8 illustrates a state in which the drive mechanism is mounted on the bottom plate.

As illustrated in FIG. 8, guide shafts 11 and 12 stand on a bottom plate 10a of the housing 10, and the guide shafts 11 extend through the base 50. The guide shaft 11 may be inserted into a first guide hole 51a formed in the first attachment portion 51, and the guide shaft 12 may be inserted into a second guide hole 52a formed in the second attachment portion 52. Thus, the first motor 31 can lift and lower the base 50.

Figure 6A:
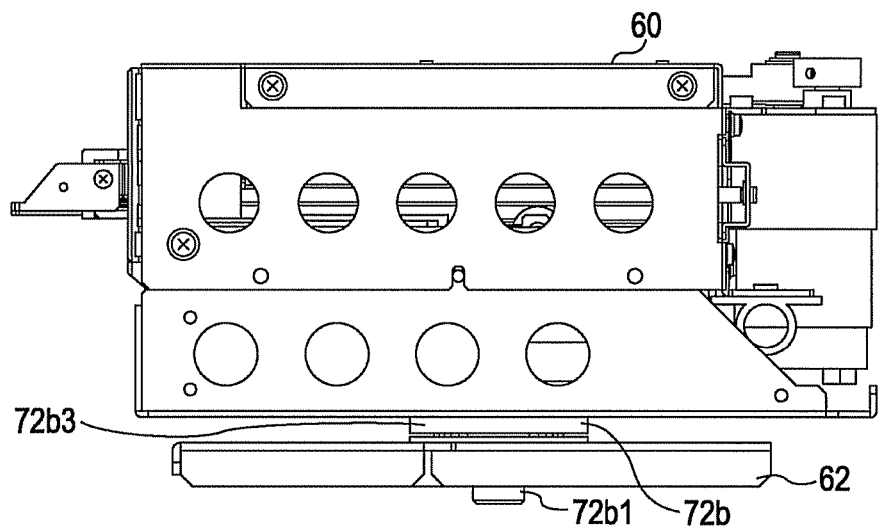
FIG. 6A is a side view of a holding mechanism.
Figure 6B:
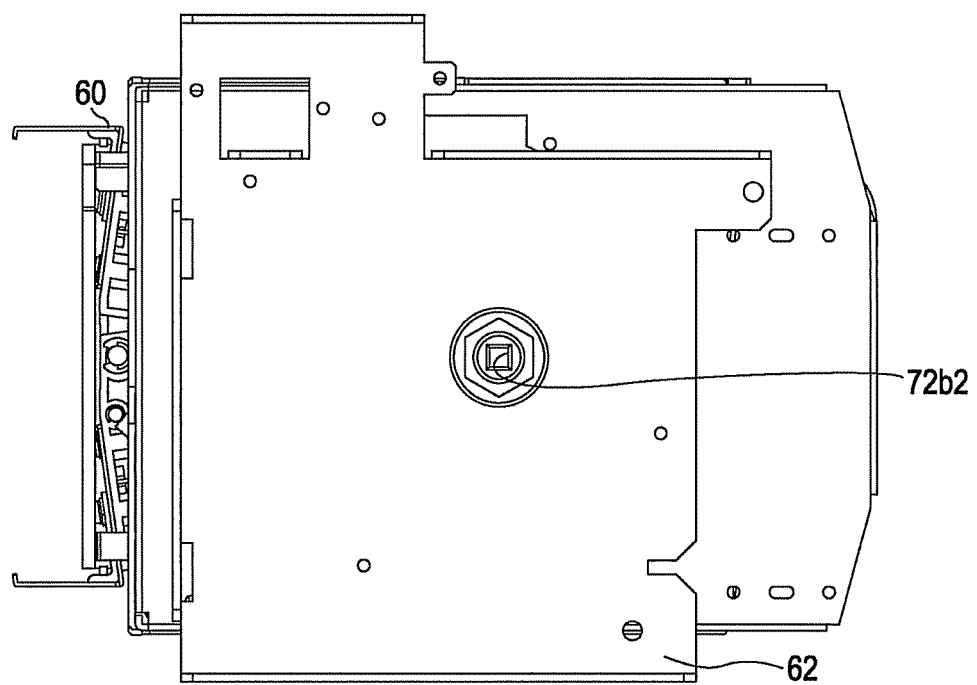
FIG. 6B is a bottom view of a holding mechanism.
Figure 7:
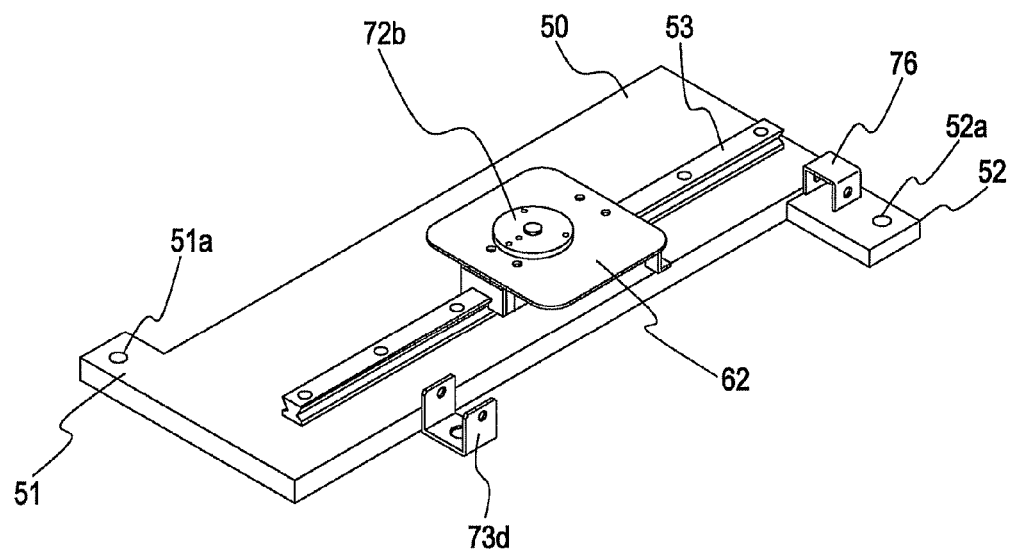
FIG. 7 illustrates the base and a region surrounding the base.

The holding mechanism 60 may be mounted on the base 50. The holding mechanism 60 may be mounted on the base 50 in the following manner. As illustrated in FIG. 5, a guide member 53 may be disposed on the base 50. The guide member 53 extends parallel to the storage shelf 20 (in the Z directions). As illustrated in FIG. 7, a slide stage member 62 may be slidably attached to the guide member 53. As illustrated in FIGS. 6A and 6B, the holding mechanism 60 may be attached to the slide stage member 62 via a shaft receiving member 72b. By mounting the holding mechanism 60 on the base 50 in this manner, the holding mechanism 60 can be lifted and lowered. The shaft receiving member 72b may be provided so as to rotate the holding mechanism 60. The shaft receiving member 72b will be described below.

Figure 9:
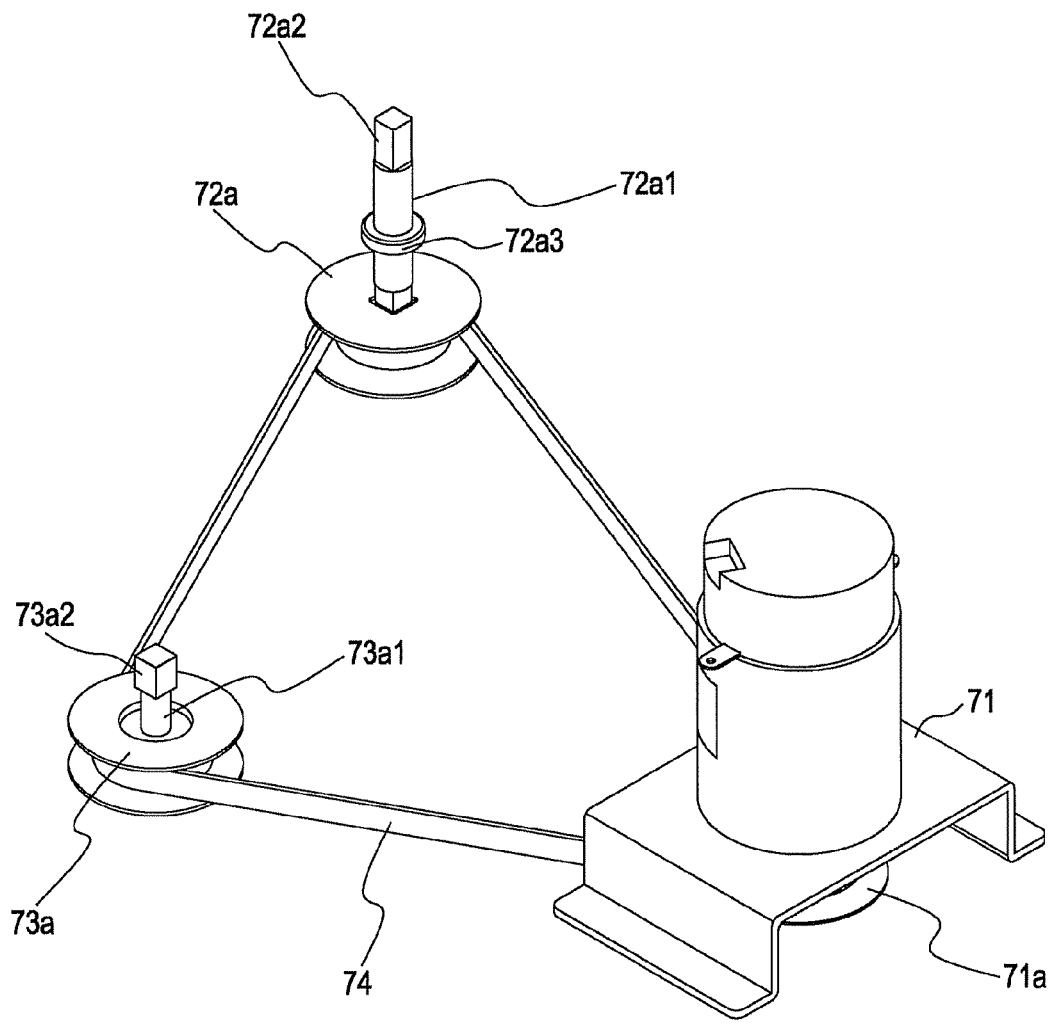
FIG. 9 is a partial perspective view of the drive mechanism.

The drive mechanism 70 moves the holding mechanism 60 in the Z directions and rotates the holding mechanism 60. As illustrated in FIG. 9, the drive mechanism 70 includes a third motor 71. As illustrated in FIG. 8, the third motor 71 may be disposed to a side of the base 50 (on the bottom plate 10a of the housing 10). An eleventh pulley 71a may be attached the rotation shaft of the third motor 71. As illustrated in FIG. 1, the drive mechanism 70 includes a first clutch 72 and a second clutch 73. By being engaged and disengaged, the first clutch 72 switches the holding mechanism 60 between a rotating state and a non-rotating state. That is, by being engaged, the first clutch 72 serves as rotation means for rotating the holding mechanism 60 with the third motor 71. By being engaged and disengaged, the second clutch 73 switches the holding mechanism 60 between a moving state and a non-moving state. That is, by being engaged, the second clutch 73 serves as movement means for moving the holding mechanism 60 with the third motor 71, together with a fifth belt 74, an attachment member 74a, and a fourteenth pulley 75, which will be described below.

As illustrated in FIG. 9, the first clutch 72 includes a twelfth pulley 72a. The twelfth pulley 72a may be attached to the bottom plate 10a illustrated in FIG. 8. A first engagement shaft 72a1 stands on the twelfth pulley 72a. At the upper end of the first engagement shaft 72a1, a first engagement portion 72a2 having a quadrangular cross section is formed. The first engagement shaft 72a1 includes a spring stopper 72a3. The first engagement portion 72a2 engages with the shaft receiving member 72b that may be attached to the lower surface of the holding mechanism 60.

Figure 10A:
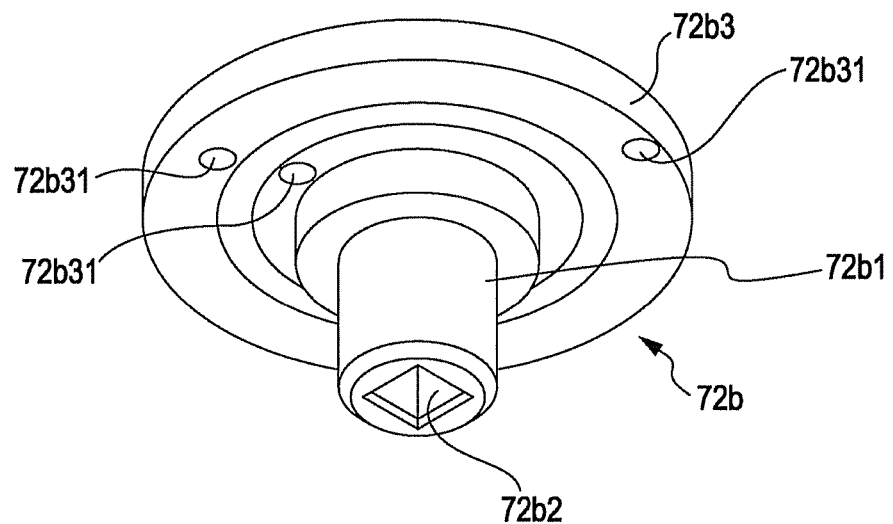
FIG. 10A is a perspective view of a shaft receiving member of a first clutch.
Figure 10B:
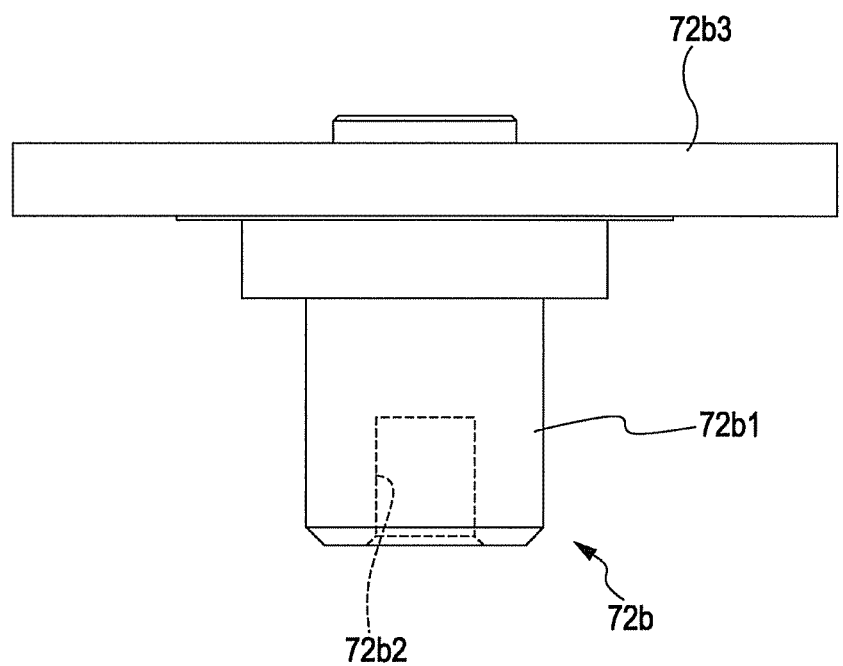
FIG. 10B is a side view of the shaft receiving member.

FIG. 10A is a perspective view of the shaft receiving member 72b, and FIG. 10B is a side view of the shaft receiving member 72b. The shaft receiving member 72b includes a cylindrical portion 72b1 and a flat plate portion 72b3. An engagement hole 72b2 may be formed in the cylindrical portion 72b1. Screw holes 72b31 are formed in the flat plate portion 72b3 so that the shaft receiving member 72b can be fixed to the holding mechanism 60 with screws.

The twelfth pulley 72a and the shaft receiving member 72b are disposed as illustrated in FIG. 11. The twelfth pulley 72a may be disposed below the guide member 53, and the shaft receiving member 72b may be disposed above the guide member 53. A spring 72c may be disposed between the guide member 53 and the spring stopper 72a3. The first engagement portion 72a2, which may be disposed at an end of the first engagement shaft 72a1, can protrude from and recede into a clearance hole 53a formed in the guide member 53. That is, when the guide member 53 is lifted and lowered together with the base 50, the first engagement portion 72a2 protrudes from and recedes into the clearance hole 53a.

Figure 12A:
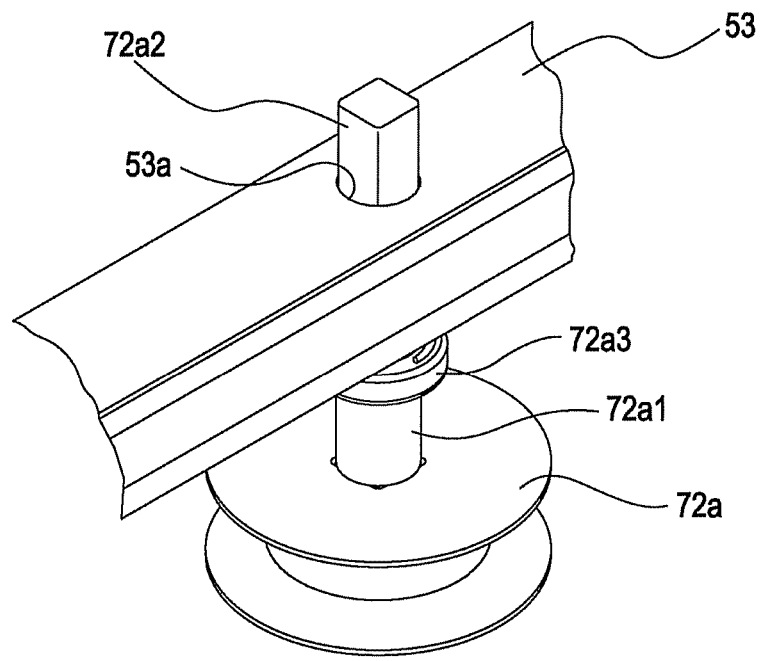
FIG. 12A is a perspective view of a first clutch in an engaged state.
Figure 12B:
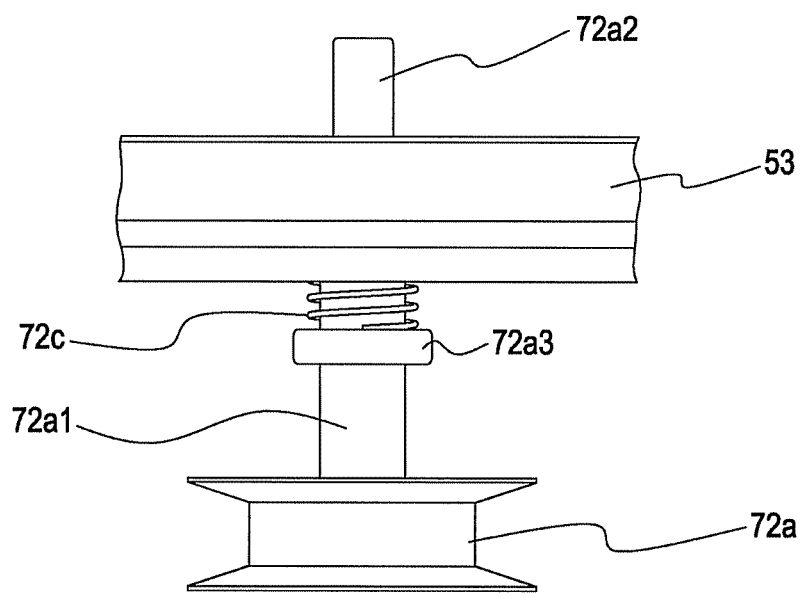
FIG. 12B is a side view of the first clutch in the engaged state.
Figure 13A:
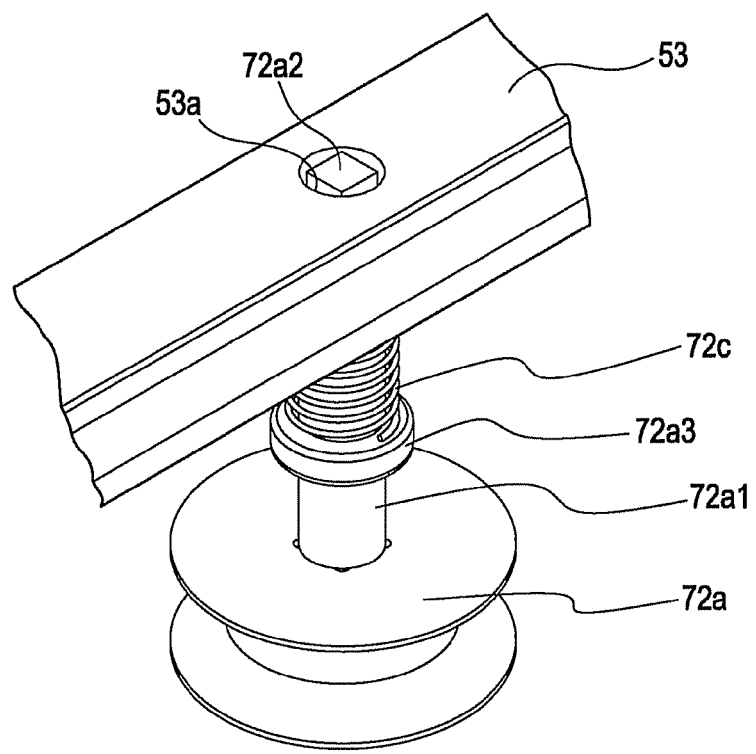
FIG. 13A is a perspective view of the first clutch in a disengaged state.
Figure 13B:
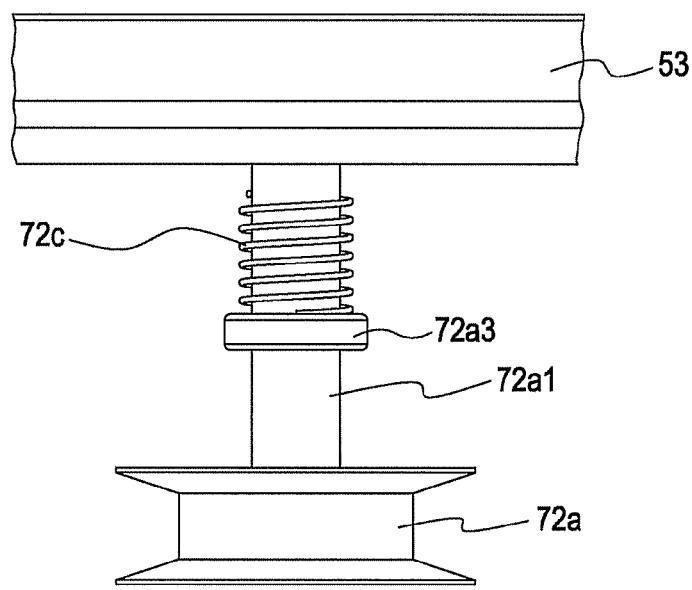
FIG. 13B is a side view of the first clutch in the disengaged state.
Figure 18:
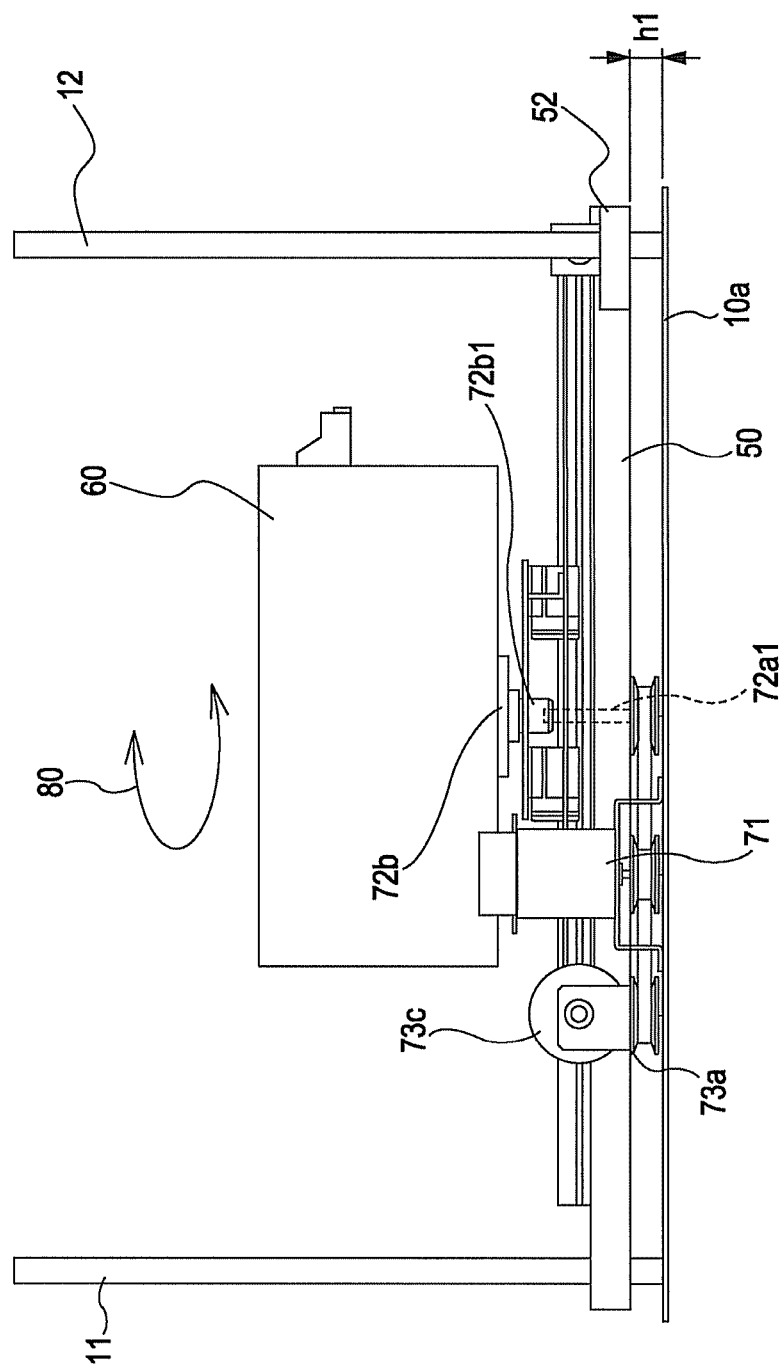
FIG. 18 illustrates an exemplary state in which the base is at a first position.
Figure 19:
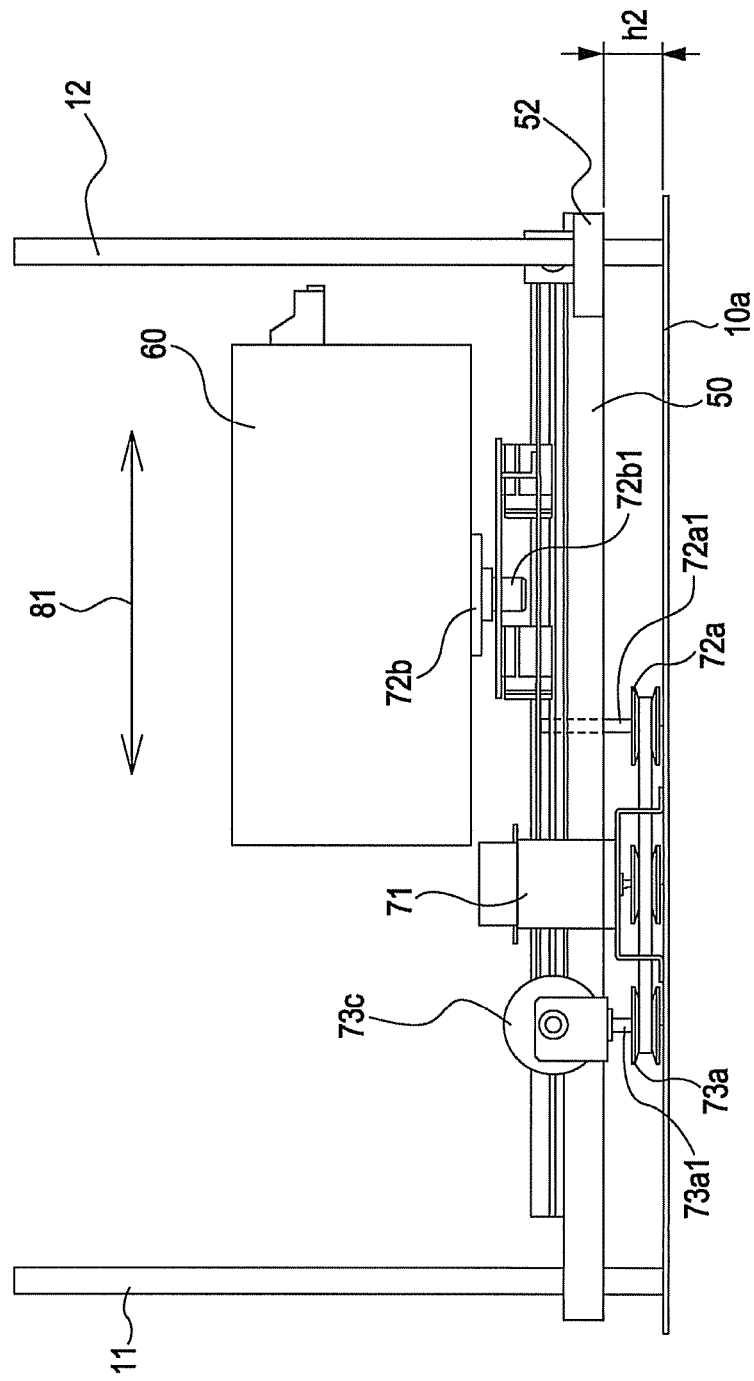
FIG. 19 illustrates an exemplary state in which the base has been lifted to a second position.

When the first engagement portion 72a2 protrudes from the clearance hole 53a as illustrated in FIGS. 12A and 12B, the first engagement portion 72a2 engages with the engagement hole 72b2 in the shaft receiving member 72b. At this time, the first clutch 72 is engaged. When the first engagement portion 72a2 recedes into the clearance hole 53a as illustrated in FIGS. 13A and 13B, the first engagement shaft 72a1 becomes disengaged with the shaft receiving member 72b. At this time, the first clutch 72 is disengaged. The first clutch 72 is engaged when the base 50, which is lifted and lowered in the Y directions, is at a first position. The first clutch 72 is disengaged when the base 50, which is lifted and lowered in the Y directions, is at a second position above the first position. When the first clutch 72 is engaged, the holding mechanism 60 can rotate in the rotation direction of the third motor 71. In the present embodiment, when the base 50 is at the first position, the distance between the bottom plate 10a and the base 50 is h1, as illustrated in FIG. 18. When the base 50 is at the second position, the distance between the bottom plate 10a and the base 50 is h2, as illustrated in FIG. 19. The distances h1 and h2 have a relationship such that h1<h2.

Figure 14:
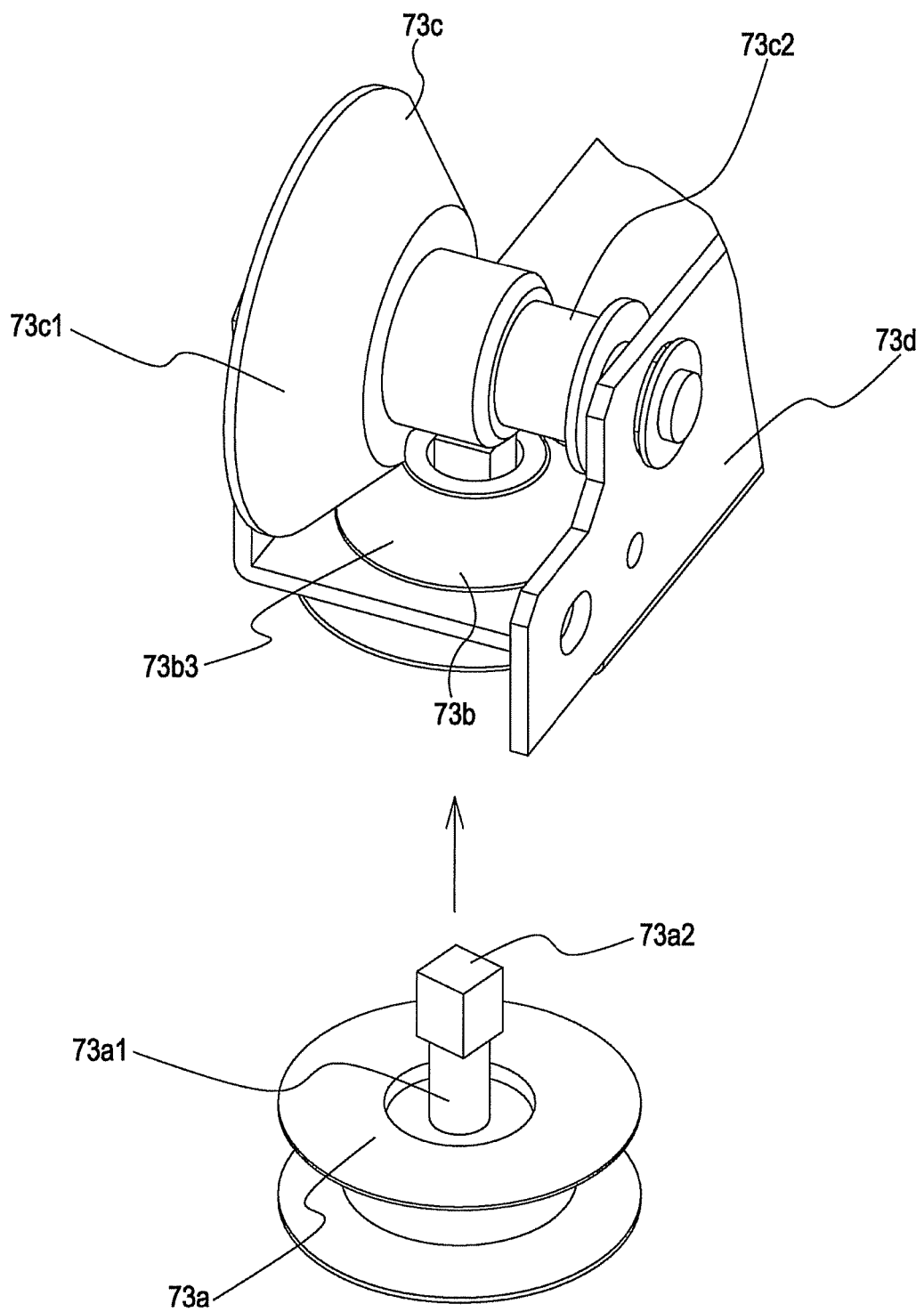
FIG. 14 is a perspective view of a second clutch.
Figure 15A:
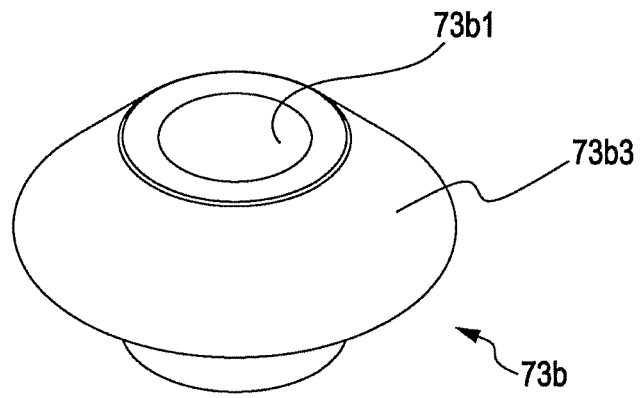
FIG. 15A illustrates a shaft receiving member of the second clutch.
Figure 15B:
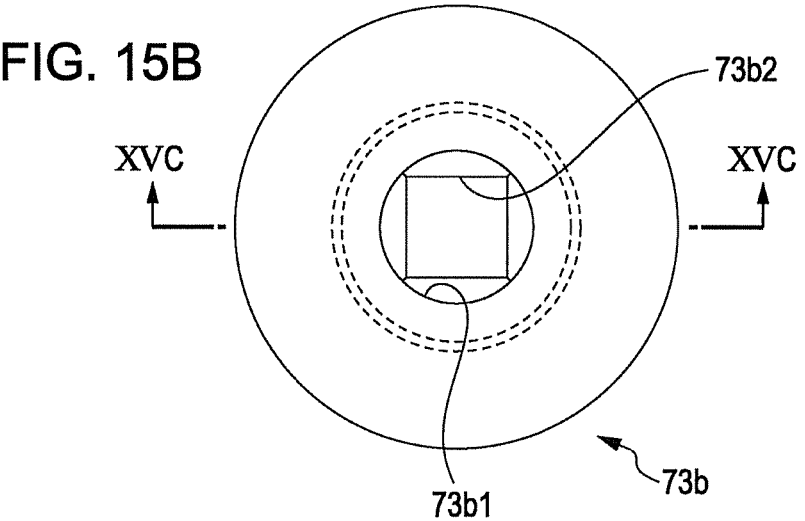
FIG. 15B is a bottom view of the shaft receiving member.
Figure 15C:
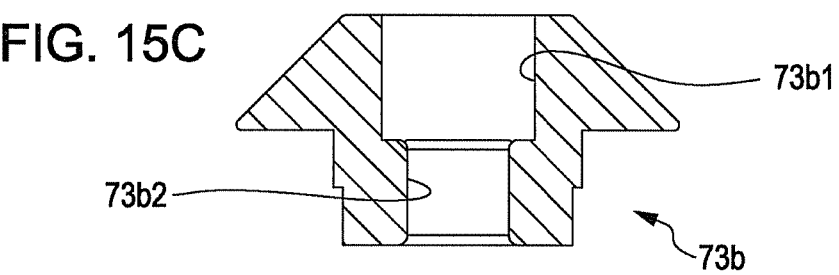
FIG. 15C is a sectional view of the shaft receiving member taken along line XVC-XVC of FIG. 15B.

As illustrated in FIG. 9, the second clutch 73 includes a thirteenth pulley 73a. As illustrated in FIG. 8, the thirteenth pulley 73a may be attached to the bottom plate 10a. As illustrated in FIGS. 9 and 14, a second engagement shaft 73a1 stands on the thirteenth pulley 73a. The lower end side of the second engagement shaft 73a1 has a cylindrical shape. On the upper end of the second engagement shaft 73a1, a second engagement portion 73a2 having a quadrangular cross section is formed. As illustrated in FIG. 14, a shaft receiving member 73b, with which the second engagement portion 73a2 engages, is supported by an attachment portion 73d. As illustrated in FIG. 7, the attachment portion 73d is fixed to the base 50. As illustrated in FIGS. 15A to 15C, the shaft receiving member 73b includes, in the inner side thereof, a cylinder portion 73b1 and an engagement hole 73b2. The shaft receiving member 73b includes, in the outer side thereof, a bevel gear portion 73b3. The bevel gear portion 73b3 is an example of rotation transmitting means for moving the holding mechanism 60. The engagement hole 73b2 has a quadrangular shape that corresponds to the shape of the second engagement portion 73a2.

As illustrated in FIG. 14, the shaft receiving member 73b is supported by the attachment portion 73d in such a manner that the bevel gear portion 73b3 faces upward. The cylinder portion 73b1 may be disposed in such a manner that, when the shaft receiving member 73b may be supported by the attachment portion 73d, the cylinder portion 73b1 may be disposed above the engagement hole 73b2. The cylinder portion 73b1 has an inner diameter that allows the second engagement portion 73a2 to freely rotate in the cylinder portion 73b1. The cylinder portion 73b1 is an example of a free rotation portion that is not engageable with the second engagement portion 73a2.

Figure 16A:
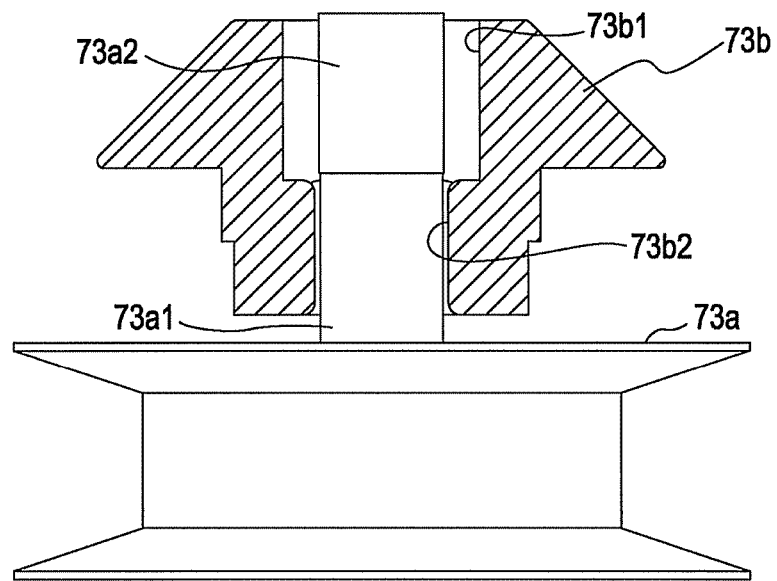
FIG. 16A illustrates a second clutch in a disengaged state.

FIG. 16A illustrates a state in which the second engagement portion 73a2 is in the cylinder portion 73b1. In this state, the second clutch 73 is disengaged. This state occurs when the base 50 is at the first position. That is, when the first clutch 72 is engaged, the second clutch 73 is disengaged.

Figure 16B:
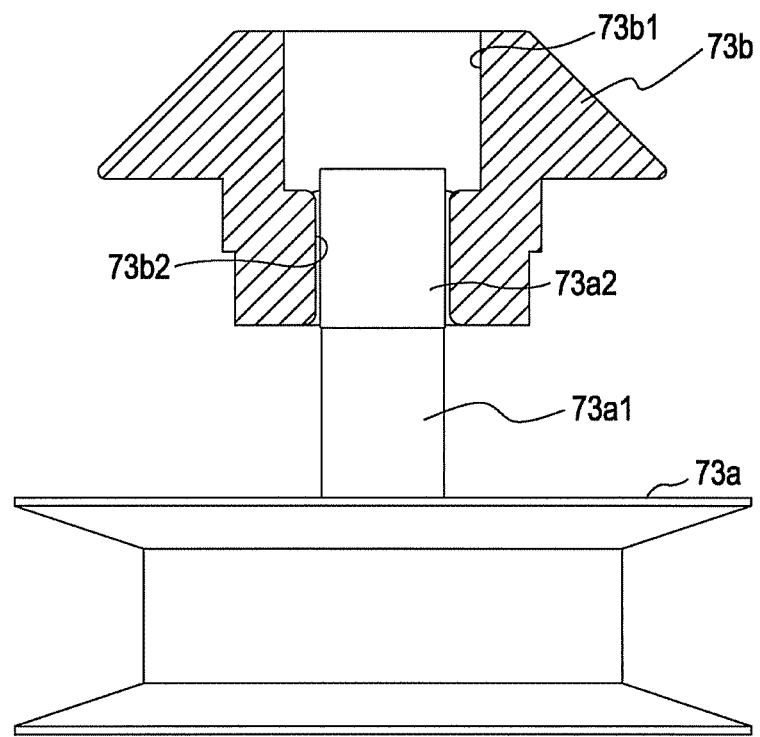
FIG. 16B illustrates the second clutch in an engaged state.

FIG. 16B illustrates a state in which the second engagement portion 73a2 is engaged with the engagement hole 73b2. In this state, the second clutch 73 is engaged. This state occurs when the base 50 is at the second position above the first position. That is, when the first clutch 72 is disengaged, the second clutch 73 is engaged.

As illustrated in FIG. 14, the second clutch 73 further includes a gear pulley 73c. The gear pulley 73c includes a bevel gear portion 73c1 and a pulley portion 73c2. The bevel gear portion 73c1 meshes with the bevel gear portion 73b3 of the shaft receiving member 73b.

As illustrated in FIG. 8, the drive mechanism 70 includes the fourteenth pulley 75, which is supported by an attachment portion 76 disposed on the base 50. The fifth belt 74 may be looped over the fourteenth pulley 75 and the pulley portion 73c2 of the gear pulley 73c. The attachment member 74a may be disposed on the fifth belt 74. The fifth belt 74 may be attached to the slide stage member 62 via the attachment member 74a. Thus, when the fifth belt 74 rotates, the holding mechanism 60 moves in the Z directions.

Figure 17:
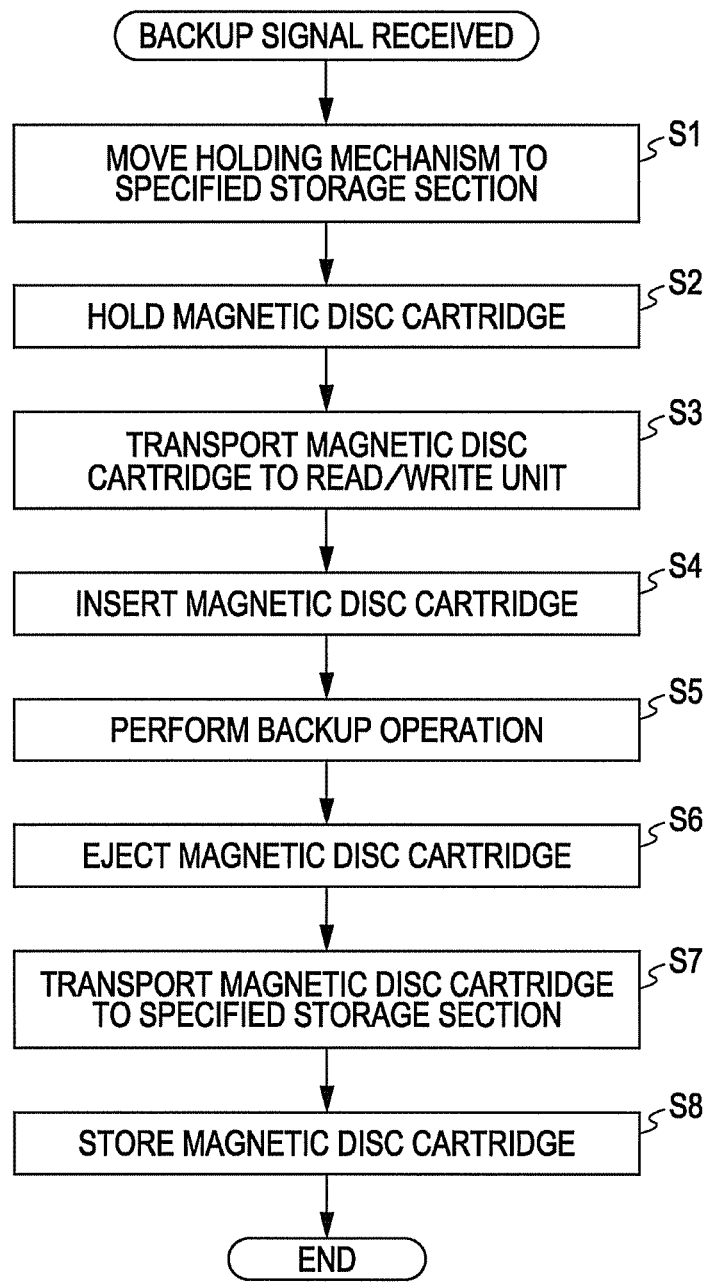
FIG. 17 illustrates an exemplary operation of the library apparatus.

FIG. 17 illustrates an exemplary operation of the library apparatus 1000 will be described. This example describes the operation performed when the controller 100 receives a data backup signal from the server 22.

In operation S1, the holding mechanism 60 is moved to a specified storage section. That is, the holding mechanism 60 is moved to a position in front of a storage section that stores a magnetic disk cartridge onto which backup data is to be written.

In order to move the holding mechanism 60 to the specified storage section, the controller 100 issues a drive command to the Y-movement mechanism 30. The controller 100 drives the first motor 31 so as to move the holding mechanism 60 to the second position illustrated in FIG. 19 with respect to the Y directions. When the holding mechanism 60 is at the second position, the second clutch 73 is engaged as illustrated in FIG. 16B. Thus, the holding mechanism 60 is ready to move in the Z directions as indicated by arrow 81 of FIG. 19.

The controller 100 drives a third motor so as to move the shaft receiving member 72b of the first clutch 72 to a position above the first engagement shaft 72a1. The controller 100 issues a drive command to the Y-movement mechanism 30 so as to move the holding mechanism 60 to the first position with respect to the Y directions. When the holding mechanism 60 is at the first position, the first clutch 72 is engaged as illustrated in FIGS. 12A and 12B. Thus, the holding mechanism 60 is ready to rotate as indicated by arrow 80 of FIG. 18.

The controller 100 issues a command to the third motor 71 so as to rotate the holding mechanism 60 so that the holding mechanism 60 faces the cartridge insertion slot of the storage shelf 20.

The controller 100 issues a command to the first motor 31 so as to return the holding mechanism 60 to the second position with respect to the Y directions. The controller 100 issues a command to the third motor 71 so as to move the holding mechanism 60 to the position of the cartridge insertion slot of the specified storage section with respect to the Z directions.

Figure 20:
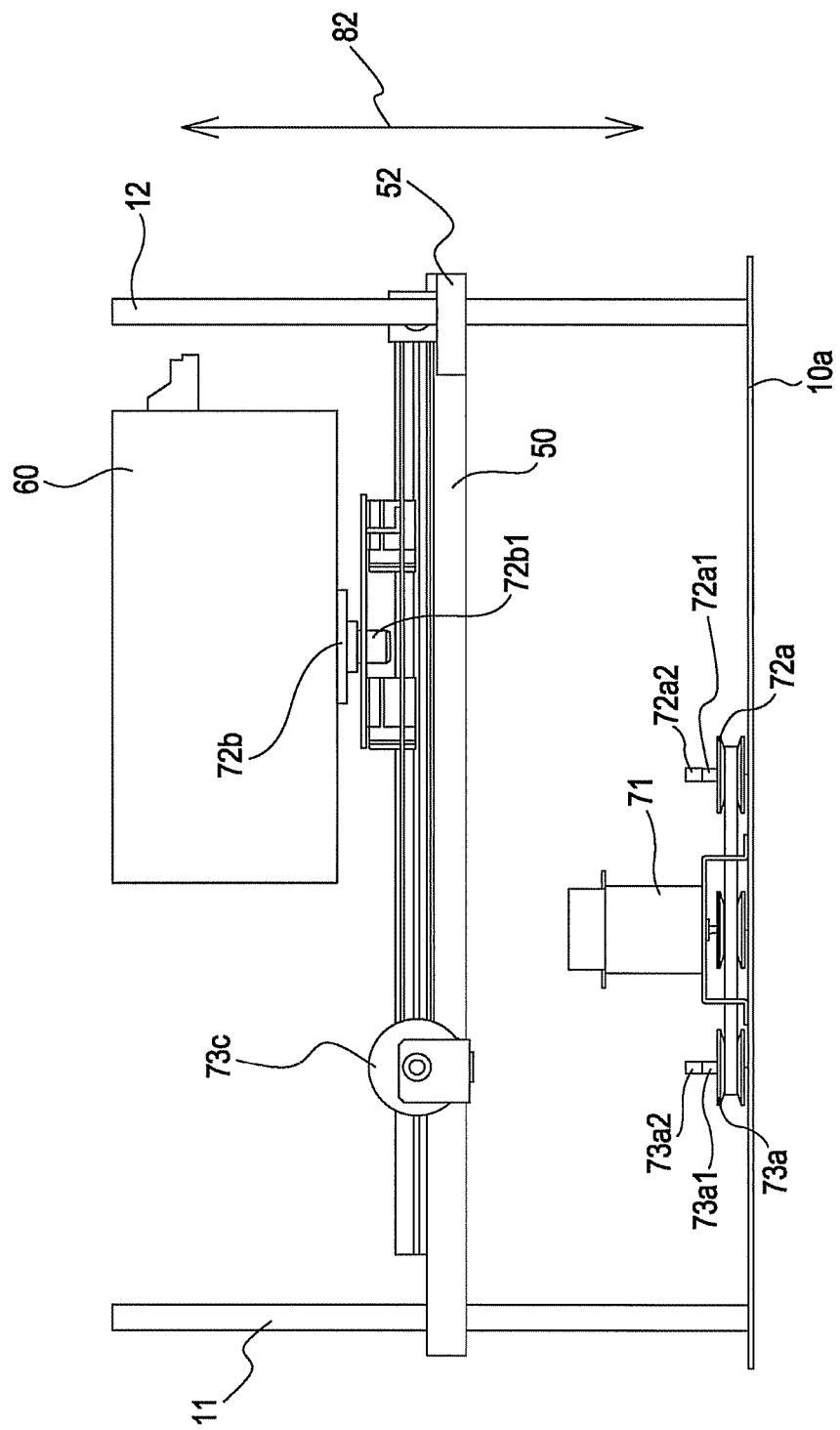
FIG. 20 illustrates an exemplary state in which the base has been lifted further.

The controller 100 issues a command to the first motor 31 so as to lift the holding mechanism 60 to the position of the cartridge insertion slot of the specified storage section with respect to the Y directions, as indicated by arrow 82 of FIG. 20. As illustrated in FIG. 20, when the holding mechanism 60 is lifted above the second position, both the first clutch 72 and the second clutch 73 are disengaged.

In operation S2, which is performed after operation S1, an operation of holding a magnetic disk cartridge is performed. The controller 100 drives the second motor 61 of the holding mechanism 60 so as to hold the magnetic disk cartridge.

In operation S3, which is performed after operation S2, the magnetic disk cartridge is transported to the read/write unit 21. In order to transport the magnetic disk cartridge to the read/write unit 21, the controller 100 issues a command to the first motor 31 so as to move the holding mechanism 60 to a second position illustrated in FIG. 19 with respect to the Y directions. When the holding mechanism 60 is at the second position, the second clutch 73 is engaged as illustrated in FIG. 16B. Thus, the holding mechanism 60 is ready to move in the Z directions as indicated by arrow 81 of FIG. 19.

The controller 100 drives the third motor 71 so as to move the shaft receiving member 72b of the first clutch 72 to a position right above the first engagement shaft 72a1. The controller 100 issues a drive command to the Y-movement mechanism 30 so as to move the holding mechanism 60 to the first position illustrated in FIG. 18 with respect to the Y directions. When the holding mechanism 60 is at the first position, the first clutch 72 is engaged as illustrated in FIGS. 12A and 12B. Thus, the holding mechanism 60 is ready to rotate.

The controller 100 issues a command to the third motor 71 so as to rotate the holding mechanism 60 so that the holding mechanism 60 faces the cartridge insertion slot of the read/write unit 21.

The controller 100 issues a command to the first motor 31 so as to return the holding mechanism 60 to the second position illustrated in FIG. 19 with respect to the Y directions. The controller 100 issues a command to the third motor 71 so as to move the holding mechanism 60 to a position in front of the read/write unit 21.

The controller 100 issues a command to the first motor 31 so as to lift the holding mechanism 60 to the Y direction position of the cartridge insertion slot of the read/write unit 21, as indicated by arrow 82 of FIG. 20.

In operation S4, which is performed after operation S3, the magnetic disk cartridge is inserted into the cartridge insertion slot of the read/write unit 21. The controller 100 drives the second motor 61 of the holding mechanism 60 so as to insert the magnetic disk cartridge held by the holding mechanism 60 into the cartridge insertion slot of the read/write unit 21.

In operation S5, which is performed after operation S4, a backup operation is performed. The controller 100 makes the read/write unit 21 perform the backup operation.

In operation S6, which is performed after operation S5, the magnetic disk cartridge is ejected. The controller 100 drives the second motor 61 of the holding mechanism 60 so as to hold the magnetic disk cartridge.

In operation S7, which is performed after operation S6, the magnetic disk cartridge is transported to the specified storage section. That is, in operation S7, the magnetic disk cartridge is returned to the original storage section. In order to transport the magnetic disk cartridge to the specified storage section, the controller 100 issues a command to the first motor 31 so as to move the holding mechanism 60 to a second position illustrated in FIG. 19 with respect to the Y directions. When the holding mechanism 60 is at the second position, the second clutch 73 is engaged as illustrated in FIG. 16B. Thus, the holding mechanism 60 is ready to move in the Z directions.

The controller 100 drives the third motor 71 so as to move the shaft receiving member 72b of the first clutch 72 to a position right above the first engagement shaft 72a1. The controller 100 issues a drive command to the Y-movement mechanism 30 so as to move the holding mechanism 60 to the first position illustrated in FIG. 18 with respect to the Y directions. When the holding mechanism 60 is at the first position, the first clutch 72 is engaged as illustrated in FIGS. 12A and 12B. Thus, the holding mechanism 60 is ready to rotate.

The controller 100 issues a command to the third motor 71 so as to rotate the holding mechanism 60 so that the holding mechanism 60 faces the cartridge insertion slot of the storage shelf 20.

The controller 100 issues a command to the first motor 31 so as to move the holding mechanism 60 to the second position illustrated FIG. 19 with respect to the Y directions. The controller 100 issues a command to the third motor 71 so as to move the holding mechanism 60 to the Z direction position of the cartridge insertion slot of the storage section.

The controller 100 issues a command to the first motor 31 so as to lift the holding mechanism 60 to the Y direction position of the cartridge insertion slot of the specified storage section as indicated by arrow 82 of FIG. 20.

In operation S7, which is performed after operation S8, the magnetic disk cartridge is stored in the specified storage section. The controller 100 drives the second motor 61 of the holding mechanism 60 so as to store the magnetic disk cartridge held by the holding mechanism in the specified storage section. After operation S7, a series of operations finishes.

In the library apparatus 1000, the drive mechanism 70 may move the holding mechanism 60 in the Z directions and rotate the holding mechanism 60. Therefore, space in the housing is efficiently utilized, whereby the library apparatus can be reduced in size and weight. Moreover, the number of driving components can be reduced, whereby the cost of the drive mechanism can be reduced. Main components of the drive mechanism 70, such as the third motor 71, are disposed to a side of the base 50. That is, a drive unit for moving the holding mechanism 60 in the Z directions and a drive unit for rotating the holding mechanism 60 are not mounted on the base 50. Therefore, the height of the structure mounted on the base 50 can be reduced. As a result, a lower part of the storage shelf, that is, storage sections adjacent to the bottom plate 10a can be efficiently utilized.

In the embodiment, the first clutch 72 is engaged when the holding mechanism 60 is at the first position, and the second clutch 73 is engaged when the holding mechanism 60 is at the second position. However, the second clutch 73 may be engaged when the holding mechanism 60 is at the first position, and the first clutch 72 may be engaged when the holding mechanism 60 is at the second position.

In the embodiment, the storage shelf 20 and the read/write unit 21 are disposed in the housing 10 at positions rotated by 90° from each other. However, the storage shelf 20 and the read/write unit 21 may be disposed adjacent to each other. In this case, it is not necessary to rotate the holding mechanism 60. Therefore, the first clutch 72 can be omitted. In order to move the holding mechanism 60 in the X directions, an additional clutch capable of transmitting and not transmitting rotation of the third motor 71 may be provided.

In the embodiment, the third motor 71 may be disposed on the bottom plate 10a of the housing 10. However, the third motor 71 may be embedded in the bottom plate 10a.

The object transported by the transport apparatus 150 according to the embodiment is a magnetic disc cartridge. However, the transport apparatus 150 can be used so as to transport other objects.

Heretofore, an exemplary embodiment has been disclosed. However, various modifications and alterations can be made within the spirit and scope of the claims.

The transport apparatus includes a drive mechanism capable of performing a plurality of operations, whereby the size of the transport apparatus can be reduced.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A transport apparatus comprising:
   a holding mechanism to hold an object to be transported;
   a base on which the holding mechanism is mounted;
   a lifting/lowering mechanism to lift and lower the base in first directions; and
   a drive mechanism to move the holding mechanism in a plane including second directions that are different from the first directions,
   and wherein the drive mechanism includes:
      a motor;
      rotation means to rotate the holding mechanism; and
      movement means to move the holding mechanism,
      the rotation means includes a first clutch that may transmit a rotation of the motor to the holding mechanism, and
      the movement means includes a second clutch that may transmit the rotation of the motor to the holding mechanism, and
   wherein the first clutch includes:
      a pulley disposed below the base,
      a first engagement shaft, standing on the pulley, including a first engagement portion, and
      a shaft receiving member, disposed on the holding mechanism, engageable with the first engagement portion, and
   wherein the second clutch includes:
      a pulley disposed below the base,
      a second engagement shaft, standing on the pulley, including a second engagement portion,
      an engagement hole engageable with the second engagement portion, a free rotation portion disposed above the engagement hole, not engageable with the second engagement portion, and
      a shaft receiving member including rotation transmitting means to move the holding mechanism.

2. The transport apparatus according to claim 1, wherein the drive mechanism includes a first motor disposed to a side of the base.

* * * * *